UNITED STATES PATENT OFFICE.

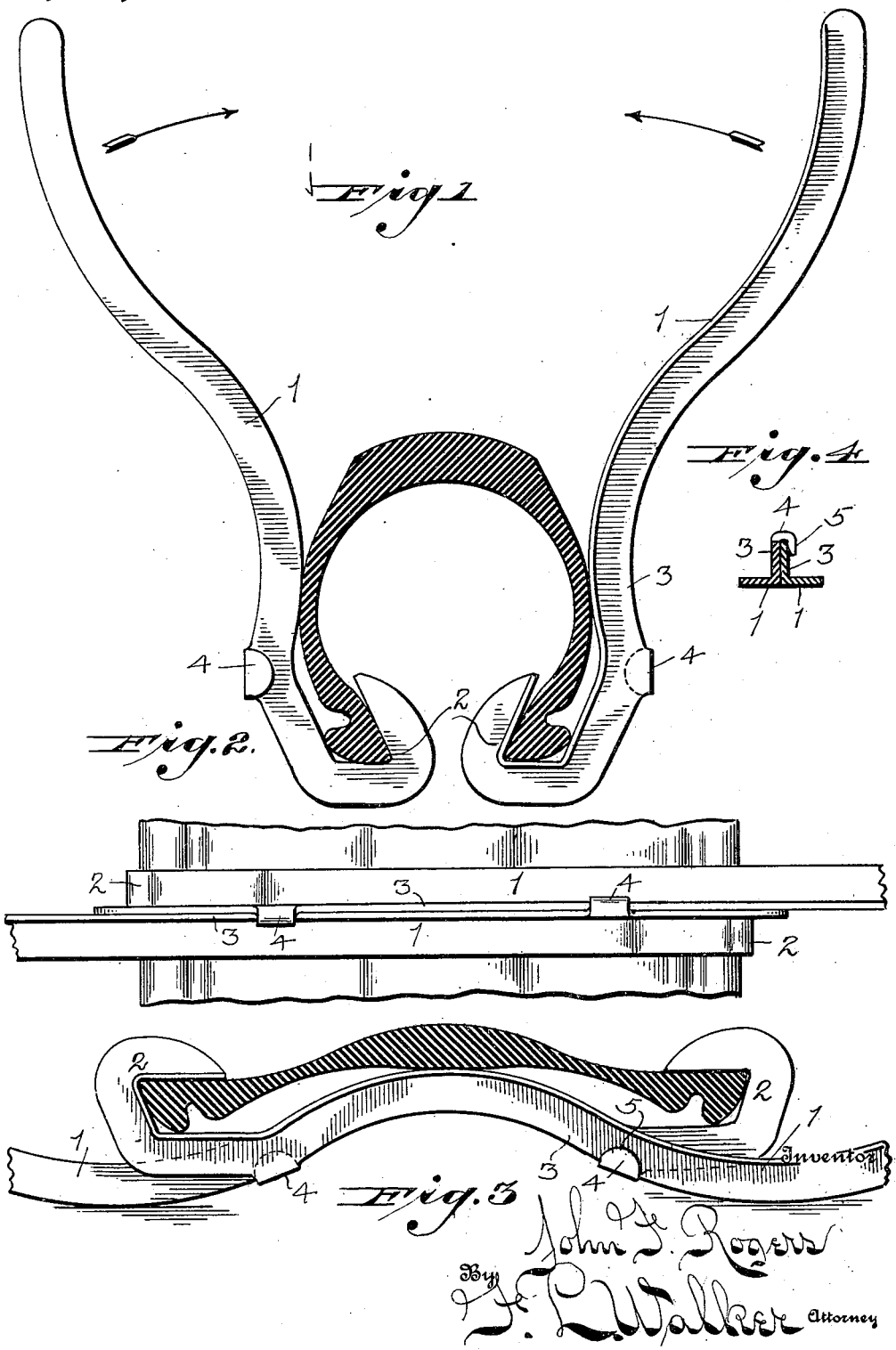

JOHN F. ROGERS, OF DAYTON, OHIO.

TIRE-TURNING TOOL.

1,373,834. Specification of Letters Patent. Patented Apr. 5, 1921.

Application filed September 13, 1920. Serial No. 410,063.

*To all whom it may concern:*

Be it known that I, JOHN F. ROGERS, a citizen of the United States, residing at Dayton, in the county of Montgomery and State of Ohio, have invented certain new and useful Improvements in Tire-Turning Tools, of which the following is a specification.

My invention relates to hand tools for garage men and tire repair operators, for distending and holding in open or reversed condition, the outer casing of a pneumatic vehicle tire to facilitate the repair thereof, and to support the distended casing in a convenient position during the repair operation.

The object of the invention is to simplify the structure as well as the means and mode of operation of such tire reversing tools, whereby they will not only be cheapened in construction, but will be more efficient in operation easily and quickly applied, capable of being easily operated, secure in their engagement, and unlikely to get out of repair.

A further object of the invention is to provide means for simultaneously and uniformly opening or reversing the tire from the opposite sides thereof, and to provide means for easily and securely locking the tire in such extended position.

I am aware that heretofore there has been employed for this purpose, a curved lever having an integral hook at one end for engagement with one edge of the tire casing, and a sliding hook upon the lever for engagement with the opposite rim of the casing. Such tool, however, involves considerable difficulty in the flexing of the tire casing sufficient for engagement with the sliding hook. The application of this tire tool as usually employed, involves engaging the end of the lever under the leg of the operator, or under some other holding device as the end of a bench, or in a vise, while the second bead or edge of the tire casing is pulled by manual effort within the range of the sliding hook. Even under such condition the engagement of the sliding hook of such prior device is found to be inconvenient for an operator working alone.

One of the primary objects of the present invention is to provide tire reversing means which may be readily and quickly applied, and operated by a single operator, with minimum strain or effort, and which will uniformly and simultaneously flex both sides of the tire casing.

A further object of the invention is to provide such a tire appliance, which will afford supporting legs upon which the distended tire may rest in an upright position during the repair operation.

With the above primary and other incidental objects in view as will more fully appear in the specification, the invention consists of the features of construction, the parts and combinations thereof, and the mode of operation, or their equivalents as hereinafter described and set forth in the claims.

Referring to the drawings Figure 1 is a transverse sectional view of a pneumatic casing to which the independent tire reversing lever forming the subject matter hereof has been applied, preparatory to distending the casing.

Fig. 2 is a plan view of the distended tire and levers interlocked in their operated positions.

Fig. 3 is a transverse sectional view of the distended tire casing, resting upon the reversing lever.

Fig. 4 is a detail sectional view of the interlocking stop lug.

Like parts are indicated by similar characters of reference throughout the several views.

The approved modern methods of tire repair involve the operating from the interior of the tire casing, and the restoration of the reinforcement means. This method of repair particularly applies to the popular type of cord tire, but also to the older style of the fabric tire. To facilitate the repair operations upon the interior of the casing, and the subsequent vulcanizing and buffing of the tire, it is desirable that the tire be very widely distended to afford easy access, to the point of operation.

The present appliances are designed to open the tire laterally to a substantially flattened condition with the interior tread of the tire fully exposed.

The tire tool comprises an arcuate lever 1, preferably though not necessarily of angle bar construction. This lever 1 is provided at one end with an integral bight, or hook 2. These hooked levers are employed in pairs. In the event that angle bars are employed for the appliance, the integral hook or bight 2 is upon the exterior face of the angle bar, whereby the upstanding flange 3 of the bar is upon the outer periphery of the hook or bight 2, and also upon the outer side of the lever. This disposition of the upstanding flange permits the flat exterior face of the bar to be brought into contact with the tire casing not only at the fulcrum point, but also at the point of engagement of the hook or tube, with the rim of the casing. Projecting laterally from the lever 1 at a medial point in spaced relation with the bight 2 is a stop shoulder or ear 4, which overhangs the outer face of the upstanding flange of the angle bar in the event that the lever is of angle bar construction, or in any event project laterally beyond the face of the lever, and is preferably though not necessarily somewhat reversed as shown at 5 in Fig. 4.

In operation, two of these hook levers are simultaneously engaged with the opposite beads or edges of the tire casing, with the extremities of the bights or hooks 2 within the casing, and the convex faces of the levers bearing upon the exterior of the casing adjacent to the tread portion thereof. This preparatory position of the levers is shown in Fig. 1. The levers 1 are then pressed toward and passed each other to positions extending transversely across the exterior face of the casing, such movement of the levers in opposite directions, one past the other simultaneously and uniformly flexes the sides of the tire casing outwardly to a distended or flattened condition. The levers are engaged with the casing in such relation that they will pass closely adjacent one to the other preferably in contact, during such transverse movement. The levers are relatively moved in opposite directions until each lever 1 passes beyond the stop lug or interlocking ear 4 of the opposing lever, beneath which it is easily and readily engaged by a slight lateral or twisting movement of the levers one toward the other. This engagement of each lever beneath the stop lug or ears 4 of the opposing lever as shown in Figs. 2 and 3 maintains the levers in their operated positions against the tension of the distended tire casing. For convenience of operation a second pair of such reversing levers is applied to the casing at the opposite side of the injury or point to be repaired. There are thus engaged with the casing two pairs of such levers in spaced relation with each other. This holds the intervening portion of the casing substantially flat and in a tensioned condition during the repair operation. The crossed levers thus applied afford supporting legs upon which the tire may rest in upright position as indicated in Fig. 3, and so render the tire self supporting. This will be found of great convenience to the operator, and greatly facilitates the repair operation, which has heretofore usually been performed with the tire suspended from some overhead support.

From the above description, it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A pair of co-acting tire turning tools each comprising a longitudinally curved bar having a fixed hook at one end of the convex side of the bar, the convex portions of the respective bars being adapted to independently fulcrum against the exterior face of the tire when arranged transversely thereacross in reversed parallel relation, and a stop member projecting from the concave side of each lever overhanging the other lever at separated points to interlock the members one with the other in their operated positions.

2. A pair of co-acting tire turning tools of the character described, each comprising a longitudinally curved bar having a hook at one end thereof on the convex side of the bar, the convex portions of the bars being adapted to independently fulcrum upon the exterior face of the tire with the hooks engaged with the margins of the tire to project the inner face of the tire beyond the plane of its marginal edges upon transverse oscillation of the bars, and a laterally disposed lug upon each bar adjacent to the hooked end engaging over the other bar when the bars are in their adjusted positions.

3. A pair of interengageable tire turning tools each comprising an independent curved lever to fulcrum upon the tire to be turned having a hook at one end on the convex side of the lever, and a hook shaped ear projecting from the opposite side of each lever for engaging the levers one with the other at spaced intervals with the levers in reverse parallel relation.

4. A pair of co-acting tire turning tools each comprising a longitudinally curved bar having tire engaging means at one end thereof, the convex portions of the respective bars being adapted to independently fulcrum against the exterior face of the tire when arranged transversely thereacross in reversed parallel relation, and means for interlocking the bars one with the other in their operated positions.

5. A pair of co-acting tire turning tools each comprising a curved bar of double contrary flexure forming an ogee curve, means for engaging one end of each bar with the tire to be turned, the opposite ends of the bars forming supporting rests upon which the engaged tire is supported, the bars being operatively arranged in reversed parallel relation when applied to the tire, and means for interengaging the bars one with the other in their operated relation.

6. As an article of manufacture, a tire turning tool comprising an ogee lever, tire engaging means at one end of the lever, and means for interengaging the said lever with a second like lever engaged with the tire in reversed parallel relation.

In testimony whereof I have hereunto set my hand this 30 day of August, A. D. 1920.

JOHN F. ROGERS.

Witnesses:
HARRY F. NOLAN,
GEORGE C. HELWIG.